United States Patent [19]
Inoue

[11] Patent Number: 5,659,745
[45] Date of Patent: Aug. 19, 1997

[54] FILE MANAGEMENT WITH ERASURE MODE INDICATING LOGICAL ERASURE OF FILES FOR AN INFORMATION RECORDING MEDIUM

[75] Inventor: Masato Inoue, Kawasaki, Japan

[73] Assignee: Canon Kabushiki Kaisha, Tokyo, Japan

[21] Appl. No.: 531,141

[22] Filed: Oct. 19, 1995

Related U.S. Application Data

[63] Continuation of Ser. No. 285,754, Aug. 3, 1994, which is a continuation of Ser. No. 758,199, Sep. 12, 1991, abandoned.

[30] Foreign Application Priority Data

Sep. 14, 1990 [JP] Japan ................................ 2-245721
Sep. 27, 1990 [JP] Japan ................................ 2-259587
Nov. 22, 1990 [JP] Japan ................................ 2-315973

[51] Int. Cl.$^6$ ........................................... G06F 17/30
[52] U.S. Cl. ................................. 395/622; 395/616
[58] Field of Search ........................... 395/600, 601, 395/616, 621, 622; 369/59, 58, 111, 100; 364/222.81, 222.82, 920; 250/588

[56] References Cited

U.S. PATENT DOCUMENTS

| | | | |
|---|---|---|---|
| 4,497,050 | 1/1985 | Beetstra | 369/59 |
| 4,800,550 | 1/1989 | Yamauchi | 369/59 |
| 4,868,806 | 9/1989 | Sakagami | 369/58 |
| 4,910,724 | 3/1990 | Sakagami et al. | 369/100 |

*Primary Examiner*—Thomas G. Black
*Assistant Examiner*—Greta L. Robinson
*Attorney, Agent, or Firm*—Fitzpatrick, Cella, Harper & Scinto

[57] ABSTRACT

A file managing method of an information recording/reproducing apparatus for managing a recording information file by recording a directory to manage the recording information file into a directory region provided on an information recording medium. In the file managing method, erasure information regarding the recording information file to be erased is recorded into the directory region in order to logically erase the recording information file. The recording information file which has logically been erased is reproduced by using the erasure information so as again to reproduce the recording information file which has logically been erased.

6 Claims, 13 Drawing Sheets

FILE MANAGEMENT WITH ERASURE MODE INDICATING LOGICAL ERASURE OF FILES FOR AN INFORMATION RECORDING MEDIUM

This application is a continuation of application Ser. No. 08/285,754, filed Aug. 3, 1994, which was a continuation of application Ser. No. 07/758,199 filed Sep. 12, 1991 now abandoned.

BACKGROUND OF THE INVENTION

1. Field of the Invention

The invention relates to a file managing method of an information recording/reproducing apparatus for recording or/and reproducing information onto/from an information recording medium.

2. Related Background Art

A directory is used as a file managing method for handling a large quantity of file data in a floppy disc, a magnetic hard disc, a magneto-optical disc, an IC card, or the like.

The directory is used as an index of a file. A file name, a time and date of the formation of the file, a writing position (head track number) of the corresponding file, and the like are included in the directory. When a new file is formed, a new directory is formed. If there is an unnecessary file, the corresponding directory is deleted, so that the files can be easily managed.

In the above system using an erasable and rewritable information recording medium such as a magnetic/magento-optical recording medium or IC card, information can be easily erased and rewritten.

In the above case, even if the file has logically been erased, the erased file physically exists so long as the region where such a file existed is not re-used.

However, when a part of or all of the above region has been used by the recording of another file, the file which has logically been erased is also physically erased.

Fundamentally, in the system using the above information recording medium, the concept such each of the erased files is preserved and managed, is not found.

On the other hand, a WORM type information recording medium whose use has been started in recent years, for instance, an optical card, is small and light and is convenient to carry. Such an optical card has a relatively large capacity and is cheap. From the above viewpoints, a large demand of such an optical card is expected as a recording medium to manage personal information.

A file managing method in such a system using the optical card as an information recording medium largely differs from a file managing method in the system using a magnetic recording medium or the like as mentioned above.

A structure of the optical card and the information recording/reproducing principle will be first explained.

FIG. 1A is a schematic plan view showing an example of an optical card. FIG. 1B is a cross sectional view taken along the line B—B in FIG. 1A.

In the diagrams, reference numeral 1 denotes an optical card. The surface of the optical card mainly comprises an information recording region 51 and a blank region 52. A logo 50 can be inserted in the blank region 52 so that the user can visually discriminate the kind, application, and the like of the optical card. A plurality of tracks 54 for tracking which have been preformated for auto tracking are arranged in parallel in the information recording region 51. Portions among adjacent tracking tracks are set to information tracks 55 on which information is recorded.

As shown in FIG. 1B, the optical card 1 comprises a plurality of layers. Reference numeral 56 denotes a transparent protecting layer and 57 indicates a recording layer. The recording layer is formed by, for instance, the silver salt system, dye system, chalcogen system, or the like. A boundary between the transparent protecting layer 56 and the recording layer 57 has a step shape, so that the tracking tracks 54 and the information tracks 55 are formed. Reference numeral 59 denotes a substrate. The substrate 59 and the recording layer 57 are jointed by an adhesive agent layer 58.

Information is recorded onto such an optical card 1 by scanning the information tracks 55 while a light beam converged into a microspot shape is modulated in accordance with recording information. The information is recorded as an information bit train which can be optically detected.

Since the information bit train is formed by a physical change such as deformation, color change, or the like by light and heat, it is impossible physically to erase the information bit train which has once been recorded and again to use the erased information bit train region as a recording region.

Information is reproduced from the recording medium by scanning the information bit train on the information tracks by a light beam spot of a predetermined power such that no recording is executed onto the medium and by detecting the reflected light or transmitted light from the medium.

A file management in the system using an optical card as an information recording medium will now be described.

When a certain amount of information is recorded onto the optical card, two kinds of information for a data file the filed information itself and a directory to manage the data file, are recorded.

At this time, in the information recording region 51 in FIG. 1A, by recording the directory and the data file into different recording regions, file management can be made easy.

Further other information is sequentially recorded into the next non-recorded regions of the data file or directory which has already existed.

The erasure of the file will now be described. To erase the unnecessary file, information which is obtained by adding information indicative of the completion of the erasure to the information of the directory to manage the file is newly recorded and the file corresponding to the new information is not read out on the system, thereby logically erasing the file.

In the system using the optical card as an information recording medium, the file management as mentioned above is performed.

In recent years, personal information has been being managed by various recording media. There are a variety of application fields. For instance, further development such as applications to a medical information management, a security information management, a parts management, an ID card, a prepaid card, and the like is expected in future.

However, in such a management system of personal information, erroneous erasure and destruction of the recorded information, and operation and forgery of information by others becomes the maximum problem. There are many cases where such a problem causes a problem of human rights.

For such a problem, in the magnetic/magneto-optical recording medium or IC card, since the file is physically erased, such a medium is improper as a recording medium to manage personal information and it is impossible to cope with the occurrence of the problem.

Although the optical card is considered to be the optimum medium as a recording medium to manage personal information with respect to a point that the recorded information is not physically erased, the conventional system using the optical card uses a file managing method similar to that of the system using the magnetic/magneto-optical recording medium or IC card. Therefore, the information which has once logically been erased cannot be reproduced again.

The above point denotes that the valuable feature of the optical card such that the recorded information is not physically erased although it has logically been erased is not adequately utilized.

SUMMARY OF THE INVENTION

The invention is made in consideration of the above problems and it is an object of the invention to provide a file managing method which can read out a file which has logically been erased.

The above object is accomplished by a file managing method for an information recording/reproducing apparatus for managing a recording information file by recording a directory to manage the recording information file into a direction region provided on an information recording medium, comprising the steps of: recording erasure information regarding the recording information file to be erased into the directory region in order to logically erase the recording information file; and reproducing the recording information file which has logically been erasure by using the erasion information to again reproduce the recording information file which has logically been erased.

The above object is also accomplished by a file managing method for an information recording/reproducing apparatus for managing a recording data file by recording a directory to manage the recording data file into a directory region provided on an information recording medium, comprising the steps of: recording erasure information regarding the recording data file to be erased and information indicative of the serial number of the erasure information into the directory region in order to logically erase the recording data file; and reproducing the logically erased recording data file by using the erasure information and the serial number of the erasure information in order to again reproduce the logically erased recording data file.

DETAILED DESCRIPTION OF PREFERRED EMBODIMENTS

An embodiment of the invention will be described in detail hereinbelow with reference to the drawings. As an example of a directory format, the case where it is used in an optical card will be explained.

First, an example of a structure of an information recording/reproducing apparatus which is used to form a directory according to the invention will be explained.

Figure 3:
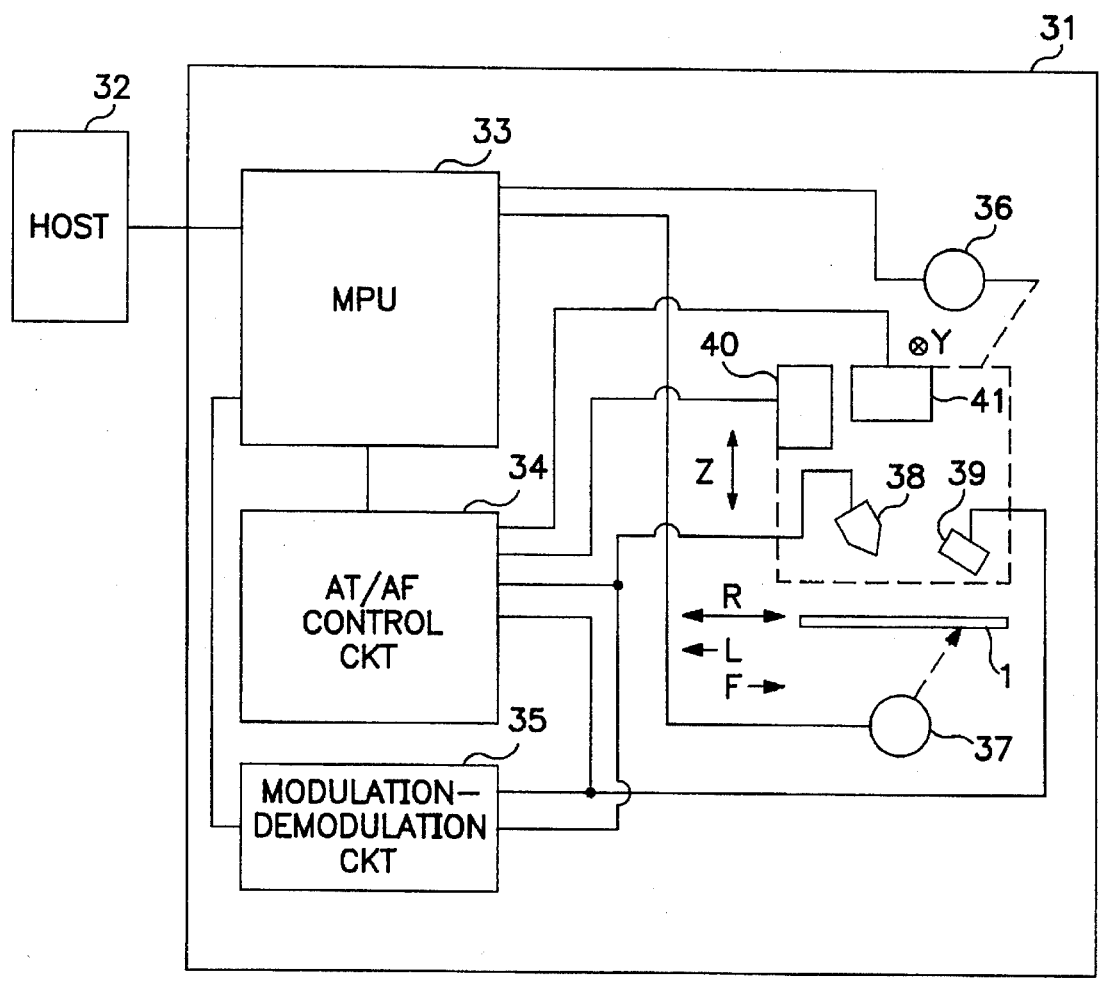
FIG. 3 shows an example of an information recording/reproducing apparatus for executing a file managing method of the invention.

FIG. 3 is a schematic diagram of an example of a structure of the information recording/reproducing apparatus which is used in the invention.

An information recording/reproducing apparatus (hereinafter, referred to as a drive) 31 is connected to an upper control apparatus (hereinafter, referred to as a host) 32. Communication, control, etc. of data are executed between the drive 31 and the host 32. An MPU 33 in the drive 31 has therein a ROM and a RAM. The MPU 33 mainly controls a card feed motor 37 and a head feed motor 36. An AT/AF control circuit 34 receives a signal of a photodetector 39 and drives an AF actuator 40 and an AT actuator 41. A modulation-demodulation circuit 35 executes the recording by changing a light emission intensity of a light source 38 upon recording and demodulates the data on the basis of the signal of the photo detector 39 upon reproduction. The host 32 executes transmission and reception of data with the drive 31 and controls the recording and reproducing operations of information in the directory section and the data section on the optical card 1.

Figure 2:
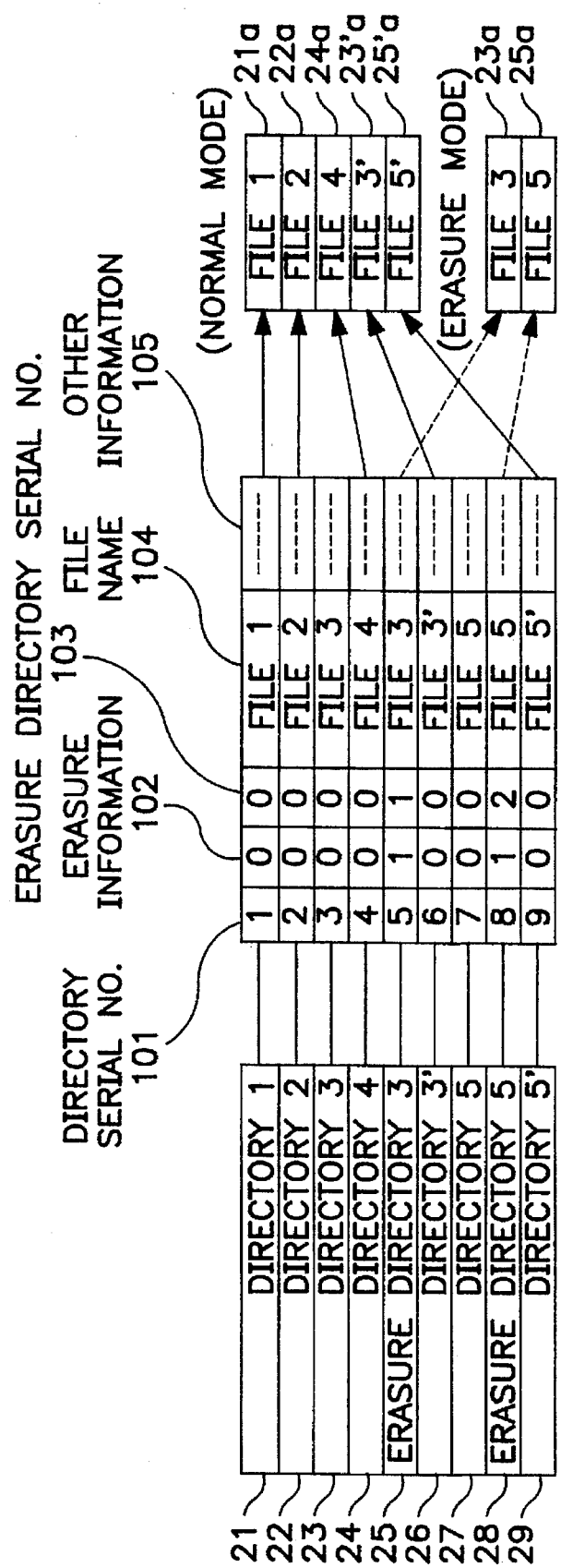
FIG. 2 is a diagram showing the first embodiment of a file managing method of the invention.

FIG. 2 is a diagram showing the first embodiment of a file managing method of the invention.

In the diagram, reference numerals 21 to 29 denote directory sections. Reference numerals 21a to 25a, 23'a and 25'a denote data sections.

Files 1 to 5, 3' and 5' in the data sections 21a to 25a, 23'a, and 25'a file information of the files 3 and 5, and information necessary for the file management have been written in directories 1 to 5, 3' and 5' and erasure directories 3 and 5 in the directory sections 21 to 29.

Formats of the directory and the erasure directory are the same. The format is constructed by a directory serial No. section 101, an erasure information section 102, an erasure directory serial No. section 103, a file name section 104, and other information section 105. One bit is assigned to the erasure information section 102. At least one or more bits are assigned to the erasure directory serial No. section 103.

One-byte information which is set to 1 in the case where the directory is the erasure directory and is set to 0 when the directory is not the erasure directory is recorded in the erasure information section 102. The 1-byte information is not always limited to 1 or 0 but any information which can judge whether the directory is the erasure directory or not can be used. The file which is managed by the erasure directory whose erasure information is set to 1 belongs to a group of logically erased files which are managed by erasure mode. The file which is managed by the directory whose erasure information is set to 0 belongs to a group of logically existing files which are managed by normal mode. Since the directories 3 and 5 are directories as objects to be erased, even if the erasure information is set to 0, the directories 3 and 5 don't belong to a group of files which are managed by normal mode.

Figure 4:
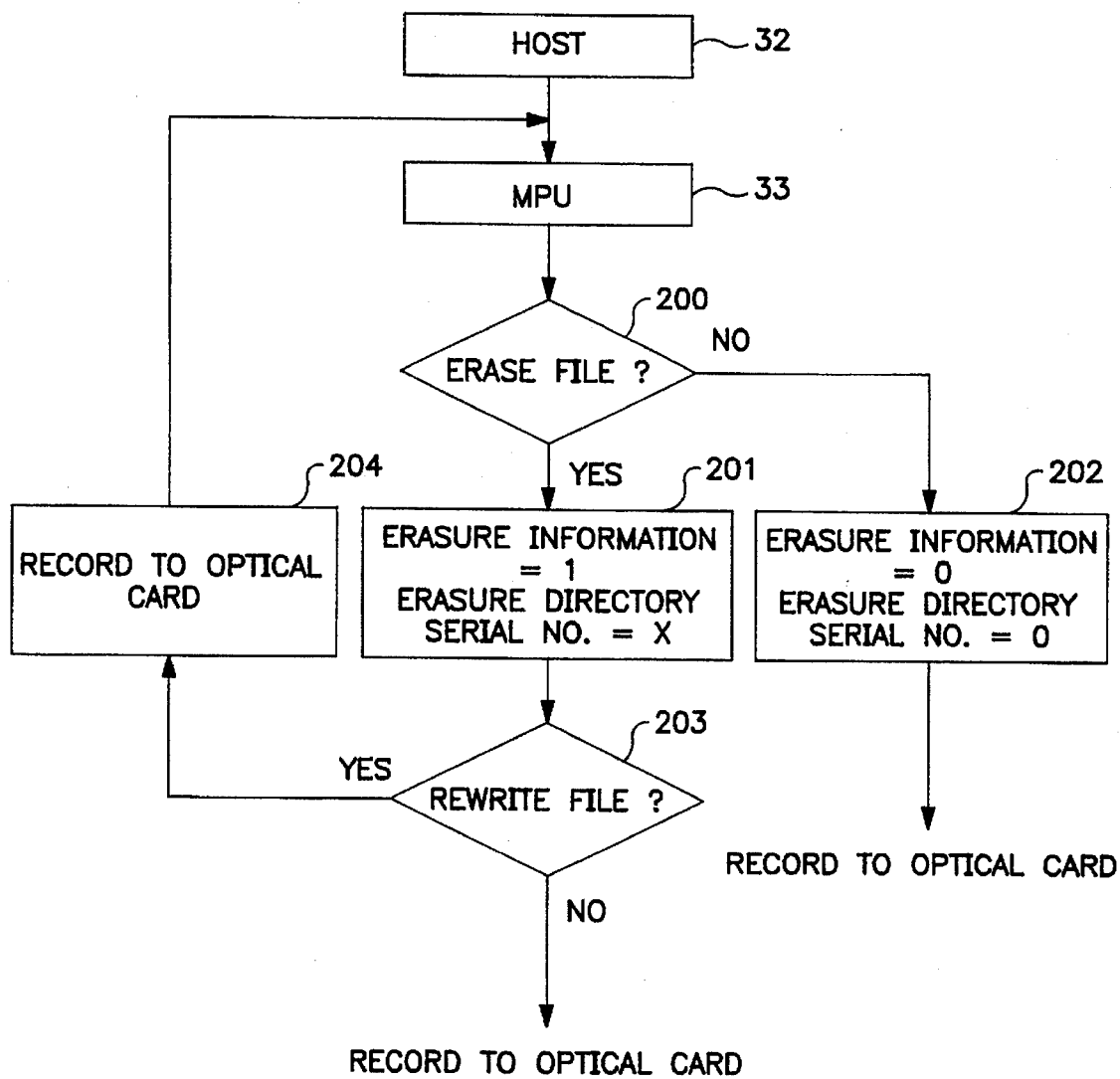
FIG. 4 is a flowchart when information is recorded in the first embodiment of the file managing method of the invention.

FIG. 4 is a flowchart of the processing for the case of recording information in the first embodiment of a file managing method of the invention.

Figure 5:
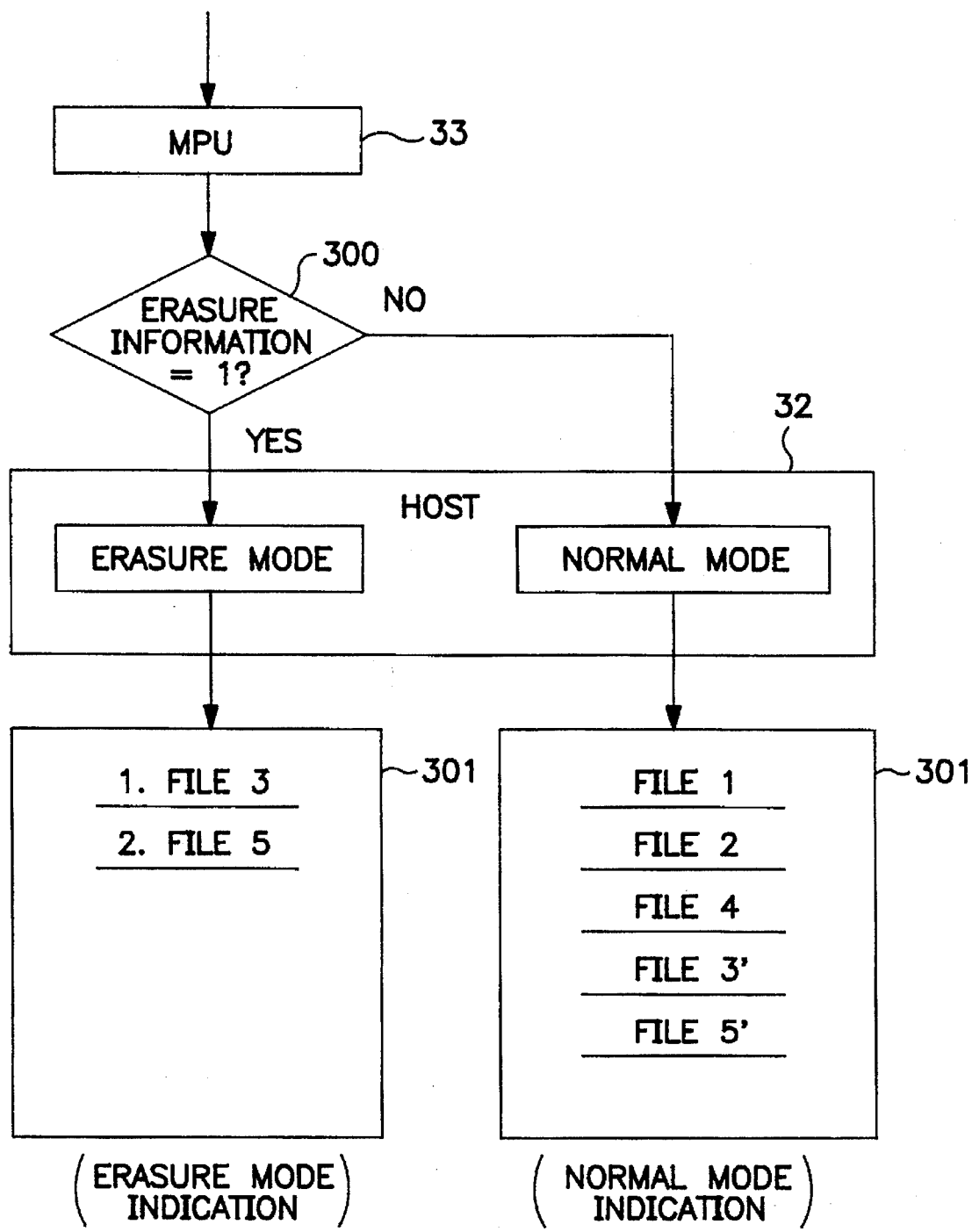
FIG. 5 is a flowchart when information is reproduced in the first embodiment of the file managing method of the invention.

FIG. 5 is a flowchart of the processing for the case of reproducing information in the first embodiment of a file managing method of the invention.

The file managing method using the directory format will now be practically explained hereinbelow with reference to FIGS. 2, 4, and 5.

In FIG. 2, the case where the content in the file 3 which is managed by the directory 3 is corrected and is again recorded onto the optical card under the same file name will now be considered.

It is now assumed that a mark (') is added to the newly recorded file name in order to make the discrimination easy. The same shall also apply to the directory names.

In FIGS. 2 and 4, information indicating that the file 3 is rewritten under the same file name as a correction data file 3' of the file 3 is sent from the host 32 to the MPU 33. In step 200, a check is made to see if the file is erased or not. In an erasure directory format 201, the erasure information section is set to 1 and the erasure directory serial No. section is set to X=1. In step 203, a check is made to see if the file is rewritten under the same file name or not. In step 204, the erasure directory 3 is recorded into the directory section 25 on the optical card. The file 3 is a file which has been erased on the optical card. The system is constructed in a manner such that when two or more directories for the same file name exist, the file of such a file name is regarded as an erasure file.

The MPU 33 confirms that the erasure directory 3 has been recorded. A check is again made in step 200 to see if the file is erased or not. In this case, since the file 3' and the directory 3' are recorded, the corrected content of the file 3 is first recorded as a file 3' into the data section 23a. The directory 3' to manage the file 3' is recorded into the directory section 26 by setting both the erasure information section and the erasure directory serial No. section to 0.

Thus, the file 3 which has been managed by the file group in the normal mode is managed by the file group in the erasure mode since the erasure directory 3 has been determined, The file 3' is newly managed by the file group in the normal mode.

Figure 1A:
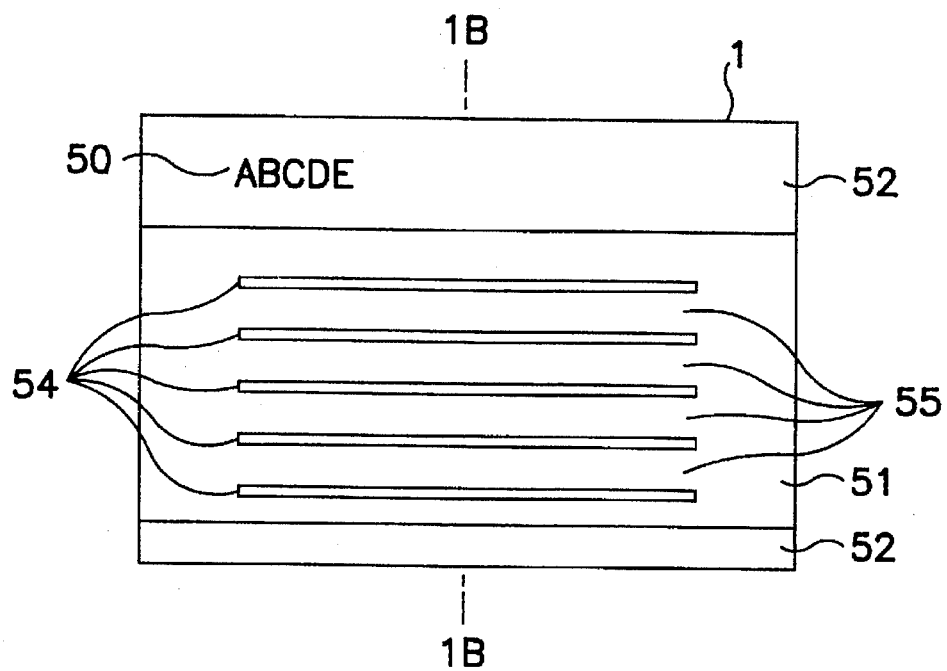
FIG. 1A is a plan view showing an example of an optical card.
Figure 1B:
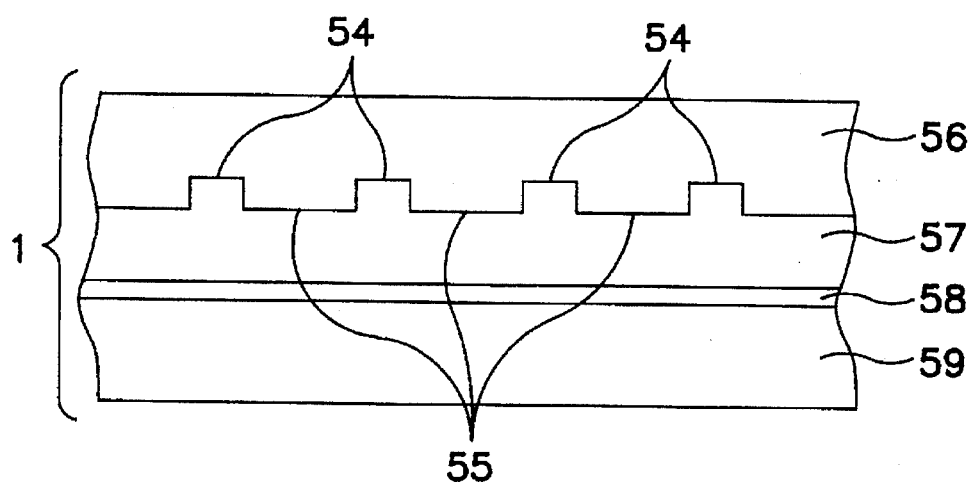
FIG. 1B a cross sectional view of FIG. 1A.

With respect to the file 5 and the directory 5 to manage the file 5 shown in FIG. 1 as well, there are relations similar to those of the file 3 among the erasure directory 5, file 5' and directory 5'. The erasure directory serial No., however, is set to X=2 in the erasure directory format 103 and is recorded.

The case where the file is corrected and is again recorded under the same file name has been described above.

However, in the case of executing only the erasure of the existing files, the answer in step 203 in the flowchart is NO and only the erasure directory is written onto the optical card.

The serial No. of the erasure directory is the serial number indicative of the recording order of the erasure directory on the optical card. It is now assumed that the number of existing erasure directories can be decided just after the optical card was inserted into the information recording/reproducing apparatus.

A reproducing method of the information recorded on the optical card will now be described with reference to FIGS. 2 and 5.

The information files 1 to 5, 3', and 5', their directories 1, 2, 4, 3', and 5', and the erasure directories 3 and 5 which have been recorded on the optical card are sent to the MPU 33 by the reproducing operation of the information recording/reproducing apparatus by a command from the host 32. In step 300, the MPU 33 checks to see if the erasure information section in each of the directory and the erasure directory has been set to 1 or not.

The files 3 and 5 corresponding to the erasure directories 3 and 5 whose erasure information sections are set to 1 are stored into the erasure mode region in the host 32. The files 1, 2, 4, 3', and 5' corresponding to the directories 1, 2, 4, 3', and 5' whose erasure information sections are set to 0 are stored into the (normal mode) region in the host 32. That is, in step 300, a check is made to see if the reproduced information is information which has been erased in the past or not, thereby distributing the reproduced information.

For each file stored in the host 32 in one of the modes discussed above, by selecting one or another mode, the file name can be displayed by a display 301 as shown in FIG. 5. It is now assumed that when the erasure mode is selected, the file names and the erasure directory serial Nos. are simultaneously displayed in order, beginning from the small serial No. Thus, the career of the erased files can be discriminated. When the normal mode is selected, the file names and the erasure directory serial Nos. are displayed in accordance with the reading order from the optical card. By selecting the file name, the content of each file can be also seen.

As described above, according to the invention, the logically existing files and the logically erased files can be managed as separate file groups. A file management is ordinarily progressed by the logically existing file group. On the other hand, by selecting the erasure mode, the group of files which have logically been erased in the past can be retrieved in accordance with the serial Nos. of the erasure directories.

In the first embodiment, 0 has been recorded into the erasure information section 102 and the erasure directory serial No. section 103 of each of the directories 1, 2, 4, 3', and 5'. However, even if the sections 102 and 103 are held in a blank state without recording any data, an effect similar to that in the first embodiment is also obviously obtained.

By management of the erasure directory serial Nos. in the first embodiment for those files having the same file name, in the case where the same files have been corrected many times and have been rewritten, by selecting the file name, the erasure career and the contents of only the files having such a file name can be retrieved. In the retrieval of the logically erased files, thus, the function can be further improved.

Moreover, it is also possible to record the erasure directories from time to time, once some predetermined number have been used, in a group into a special region (not shown) on the optical card.

For the management of the erasure directories, it is also possible to construct the apparatus in such a manner that only a predetermined number of erasure directories are managed; for instance, assuming that such a predetermined number is set to 5, when the erasing and updating operations have been performed seven times, only five erasure directories are displayed from the erasure directories having new erasure careers.

Even by the above construction, an effect similar to that of the first embodiment can be obtained and the function of the file management can be improved.

The second embodiment of a file managing method of the invention will now be described.

In the second embodiment, the erasure directory serial Nos. is included in the erasure information.

Figure 6:
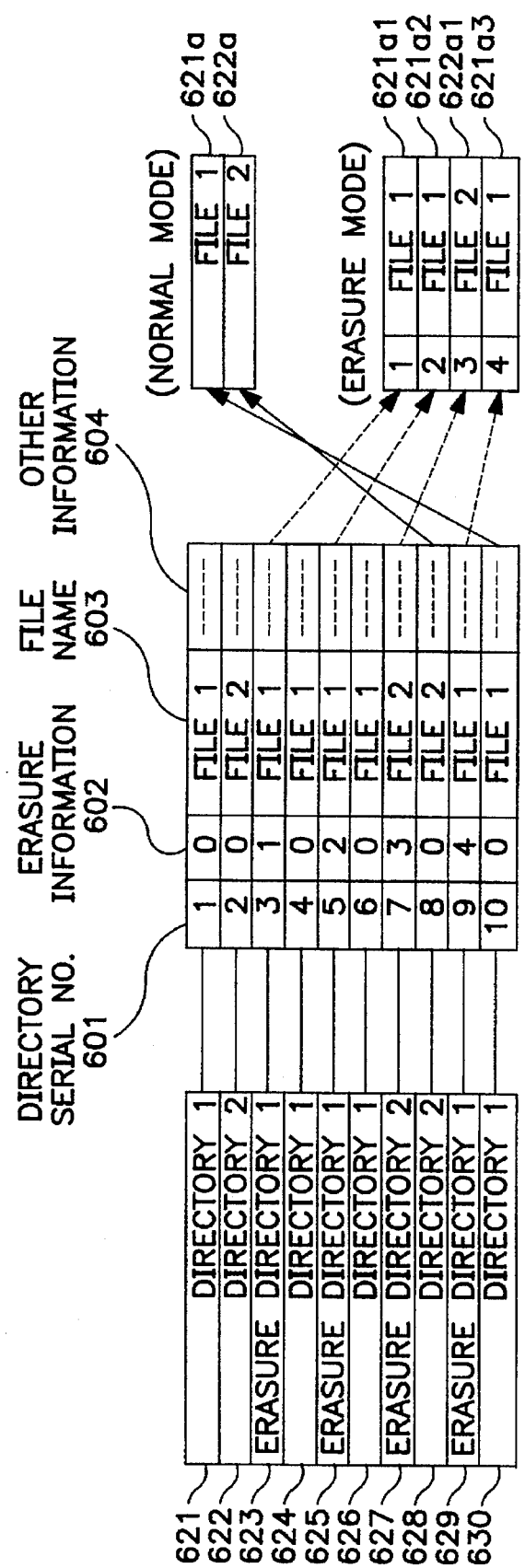
FIG. 6 is a diagram showing the second embodiment of a file managing method of the invention.

FIG. 6 is a diagram showing the second embodiment of a file managing method of the invention.

In the diagram, reference numerals 621 to 630 denote directory sections. Reference numerals 621a, 622a, 621a1 to 621a3, and 622a1 denote data sections.

Among the directory sections 621 to 630, the directory sections 623, 625, 627, and 629 indicate erasure directories and the other directory sections 621, 622, 624, 626, 628, and 630 indicate directories.

The directory and the erasure directory have the same format. The format is constructed by a directory serial No. section 601, an erasure information section 602, a file name section 603, and other information section 604. At least one or more bits are assigned to the erasure information section 602.

A serial No. consisting of a number of bytes indicating at which number the erasure directory has been established in the optical card is recorded by a numeral other than 0 into the erasure information section 602 if the directory is the erasure directory. If the directory is not the erasure directory, 0 is recorded into the erasure information section 602.

In the embodiment, if the erasure information has a numeral other than 0, the directory is decided as an erasure directory. The file which is managed by the erasure directory belongs to a group of logically erased files which are managed in the erasure mode. The file which is managed by the directory whose erasure information is set to 0 belongs to a group of logically existing files which are managed in the normal mode. However, since the directories in the directory sections 621, 624, 626, and 622 are already the directories as objects to be erased, even if the erasure information is equal to 0, they don't belong to the group of files which are managed in the normal mode.

Figure 7:
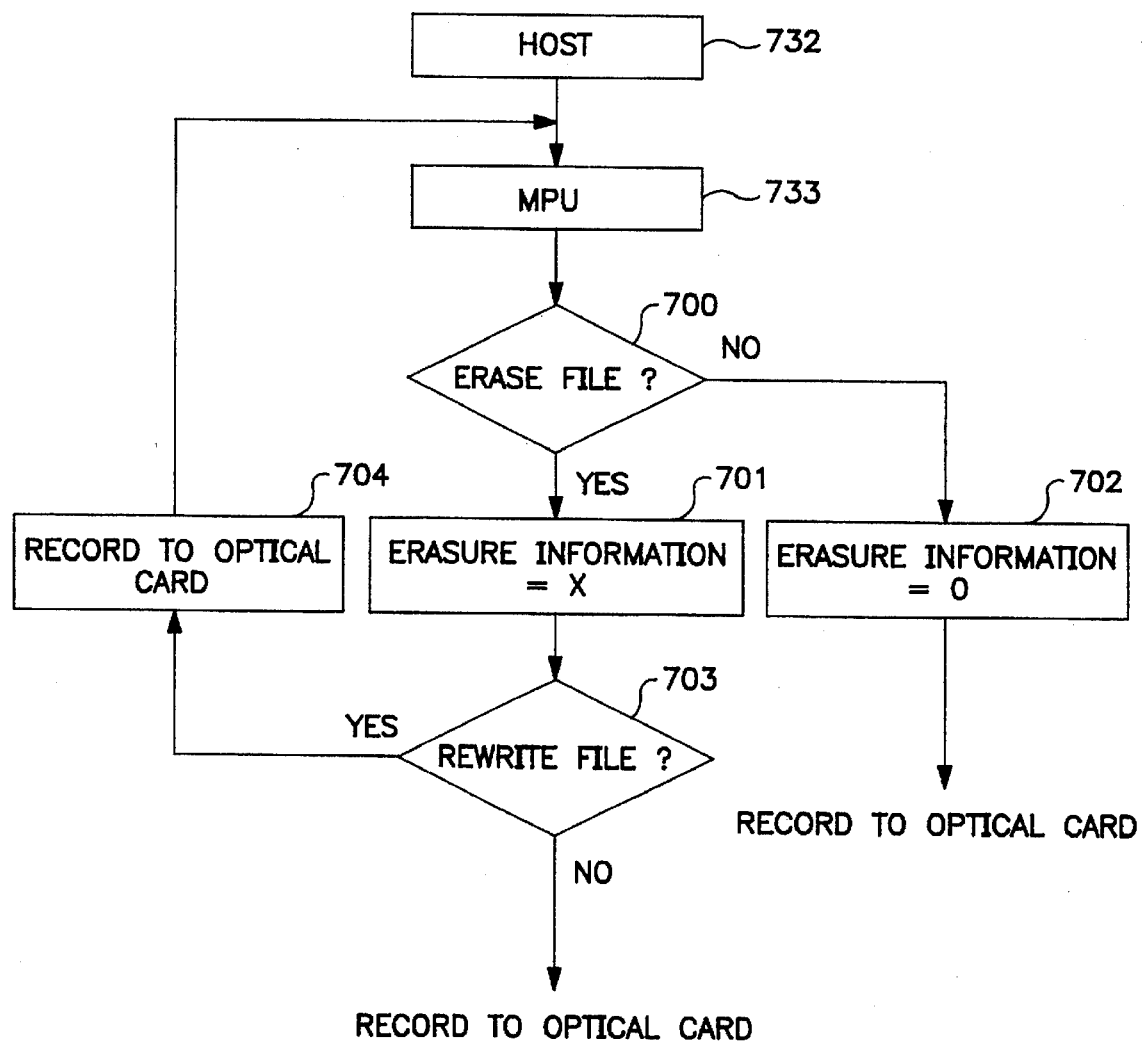
FIG. 7 is a flowchart when information is recorded in the second embodiment of the file managing method of the invention.

FIG. 7 is a flowchart of the processing for the case of recording information in the second embodiment of a file managing method of the invention.

Figure 8:
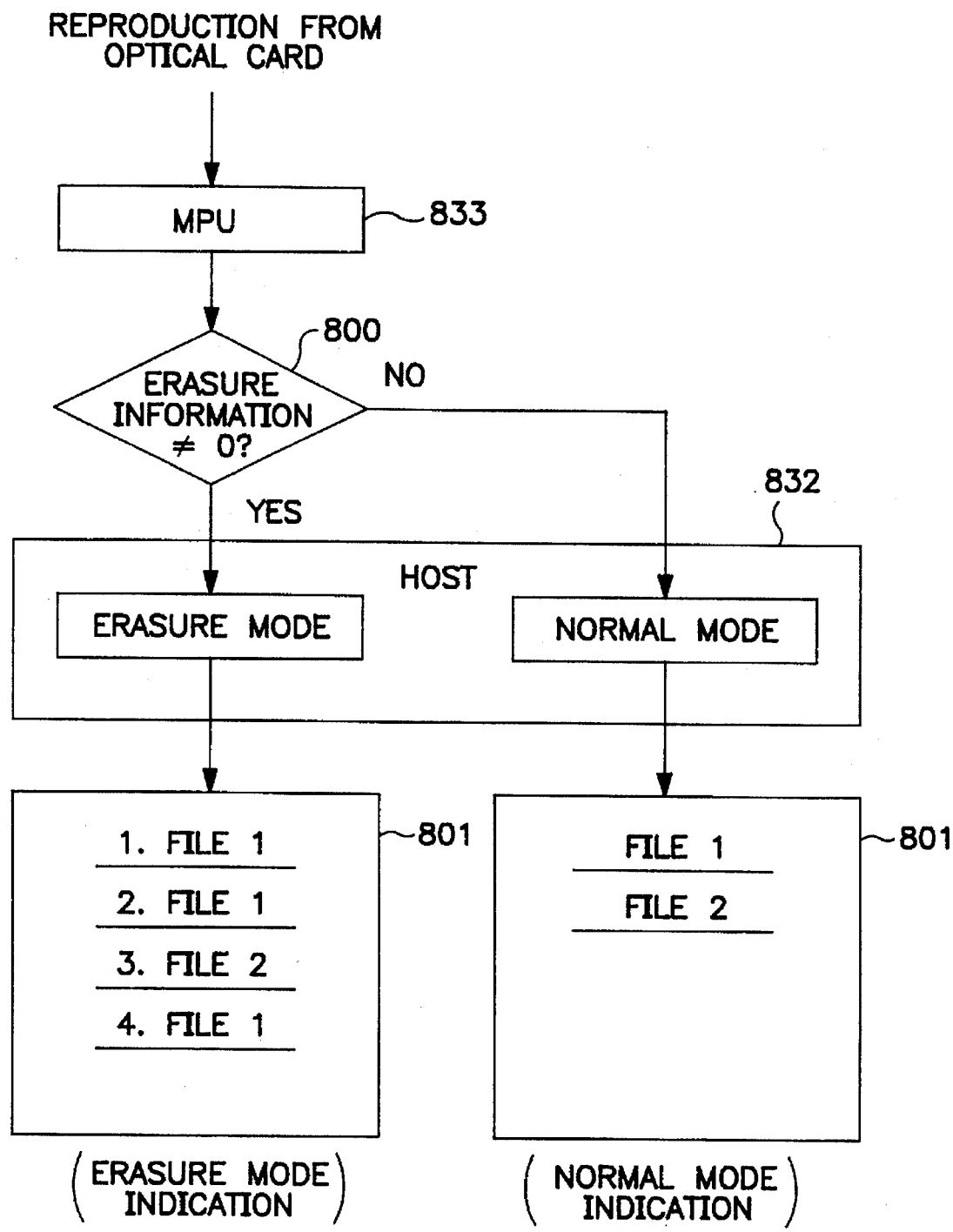
FIG. 8 is a flowchart when information is reproduced in the second embodiment of the file managing method of the invention.

FIG. 8 is a flowchart of the processing for the case of reproducing information in the second embodiment of a file managing method of the invention.

The second embodiment of the file managing method of the invention using the directory format will now be practically explained hereinbelow with reference to FIGS. 6, 7, and 8.

In FIG. 6, a case where the content of the file 1 which is managed by the directory 1 of the directory serial No. 1 is corrected and is again recorded onto the optical card by the same file name will now be considered.

In FIGS. 6 and 7, information indicating that the file 1 is rewritten under the same file name as a correction data file 1 of the file 1 is sent from a host 732 to an MPU 733. In step 700, a check is made to see if the file is erased or not. The erasure information section is set to 1 in an erasure directory format 701. A check is made in step 703 to see if the file is rewritten under the same file name or not. In step 704, the erasure directory 1 is recorded into the directory section 623 on the optical card. The contents of the file name section 603 and the other information section 604 of the erasure directory 1 are the same as the contents in the directory 1. The file 1 becomes a file which has first been erased on the optical card.

The MPU 733 confirms that the erasure directory 1 has been recorded into the directory section 623. In step 700, a check is again made to see if the file is erased or not. In this case, since the correction data file 1 and the directory 1 of the directory serial No. 4 which manages the correction data file 1 are recorded, the correction data file 1 is first recorded as a file 1 into the file section. The directory 1 of the directory serial No. 4 is subsequently recorded into the directory section 624 by setting the erasure information section to 0.

Thus, the file 1 which has been managed by the file group of the normal mode is managed by the file group of the erasure mode since the erasure directory 1 of the directory serial No. 3 has been determined. Thus, the file 1 which is newly managed by the directory serial No. 4 is managed by the file group of the normal mode.

In FIG. 6, the files are respectively erased by the directory Nos. 5, 7, and 9. Further, with respect to the recording of the correction data files and the management directories as well, they are managed by processes similar to those in the foregoing file management. However, the erasure information recorded in the erasure directories of the directory serial Nos. 5, 7, and 9 is set to 2, 3, and 4 as shown in FIG. 6, respectively.

The erasure information of the erasure directories in the embodiment indicate the serial Nos. showing the recording order of the erasure directories of the optical card. The serial No. as erasure information increases one by one each time the erasure directory is added. The number of existing erasure directories is determined by detecting the erasure information in the last erasure directory by reading out the directory which is executed when the optical card is inserted into the information recording/reproducing apparatus.

The case where the file is corrected and is again recorded by the same file name has been described above. However, in the case of executing only the erasure of the existing files, by deciding that the answer in step 703 in the flowchart is NO, only the erasure directories are written onto the optical card.

A reproducing method of the information recorded on the optical card will now be described by using FIGS. 6 and 8.

The files in the data sections 621a, 622a, 621a1, 621a2, 622a1, and 621a3 which have been recorded on the optical card and the directories which manages the files or the erasure directories are sent to the MPU 833 by the reproducing operation of the information recording/reproducing apparatus by a command from a host 832. In step 800, an MPU 833 checks to see if each directory or each erasure information section in the erasure directory is equal to 0 or not. A group of files which are managed by the erasure directories of the directory serial Nos. 3, 5, 7, and 9 whose erasure information sections are not 0 are stored into an (erasure mode) region in the host 832.

A group of files which are managed by the directories of the directory serial Nos. 8 and 10 whose erasure information sections are equal to 0 are stored into a normal mode region in the host 832. That is, in step 800, a check is made to see if the reproduced information is the information which has been erased in the past or not, thereby distributing the reproduced information.

For the file groups stored into the host 832 every mode, by selecting each mode, the file names can be displayed on a display 801 as shown in FIG. 8.

At this time, when the erasion mode is selected, the file names and the serial Nos. as erasion information thereof are simultaneously displayed in order beginning from the small serial No. Thus, a career of the erased files can be judged. When the normal mode is selected, they are displayed in accordance with the reading order from the optical card.

By selecting the file names in both of the erasion mode and the normal mode, the content of each file can be also seen.

As mentioned above, according to the invention, the logically existing files and the logically erased files can be managed as separate file groups. A file management is ordinarily progressed by a group of logically existing files. On the other hand, by selecting the erasion mode, a group of files which have logically been erased in the past can be retrieved in accordance with the serial Nos. as erasion information of the erasure directories.

In the second embodiment, a numeral of 0 has been recorded into the erasion information section 602 of each directory. However, enen if the erassion information sections 602 are held in a blank state without recording any numeral, an effect similar to that in the second embodiment is obtained.

Figure 9:
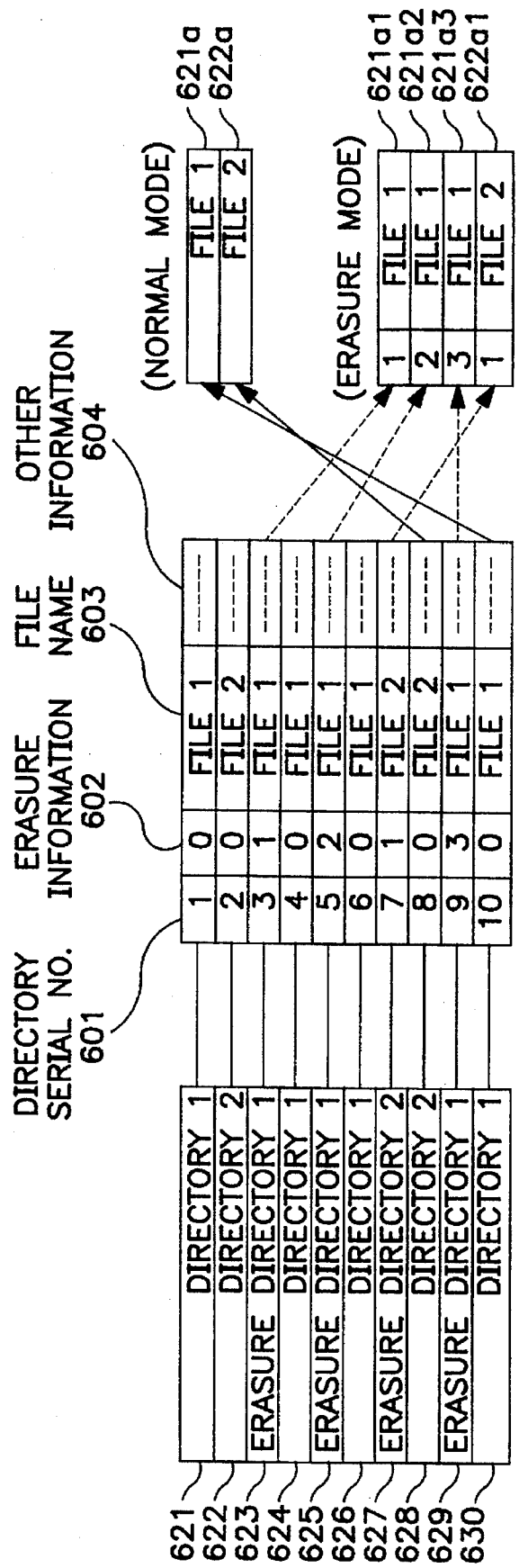
FIG. 9 is a diagram showing a file managing method of a modification of the second embodiment.

As shown in FIG. 9, by independently managing the serial Nos. as erasure information of the erasure directories every file or the same file name, an effect similar to that of the second embodiment can be also derived. Further, in the retrieval of the logically erased files, the function can be further improved.

Moreover, the erasure directories can be also recorded in a lump into a special region (not shown) on the optical card on a unit basis of a predetermined number when the number of erasure directories has reached the predetermined number.

For the management of the erasure directories, it is also within the invention to construct the apparatus in a manner such that only a predetermined number of erasure directories are used as objects. For instance, assuming that such a predetermined number is set to 5, when the erasing and updating operations have been executed seven times, only five erasure directories are displayed from the erasure directory having a new erasure career.

By the above constructions, an effect similar to that of the second embodiment can be also obtained. The function of the file management can be improved.

The third embodiment of a file management method of the invention will now be described.

In the third embodiment, a non-recorded region (region in which information can be written later) is added to the directory and the erasure information is recorded into the non-recorded region. Due to this, as shown in the above first and second embodiments, it is not necessary to record the erasure directories of the same file name into the directory region. The space of the directory region can be saved.

Figure 10:
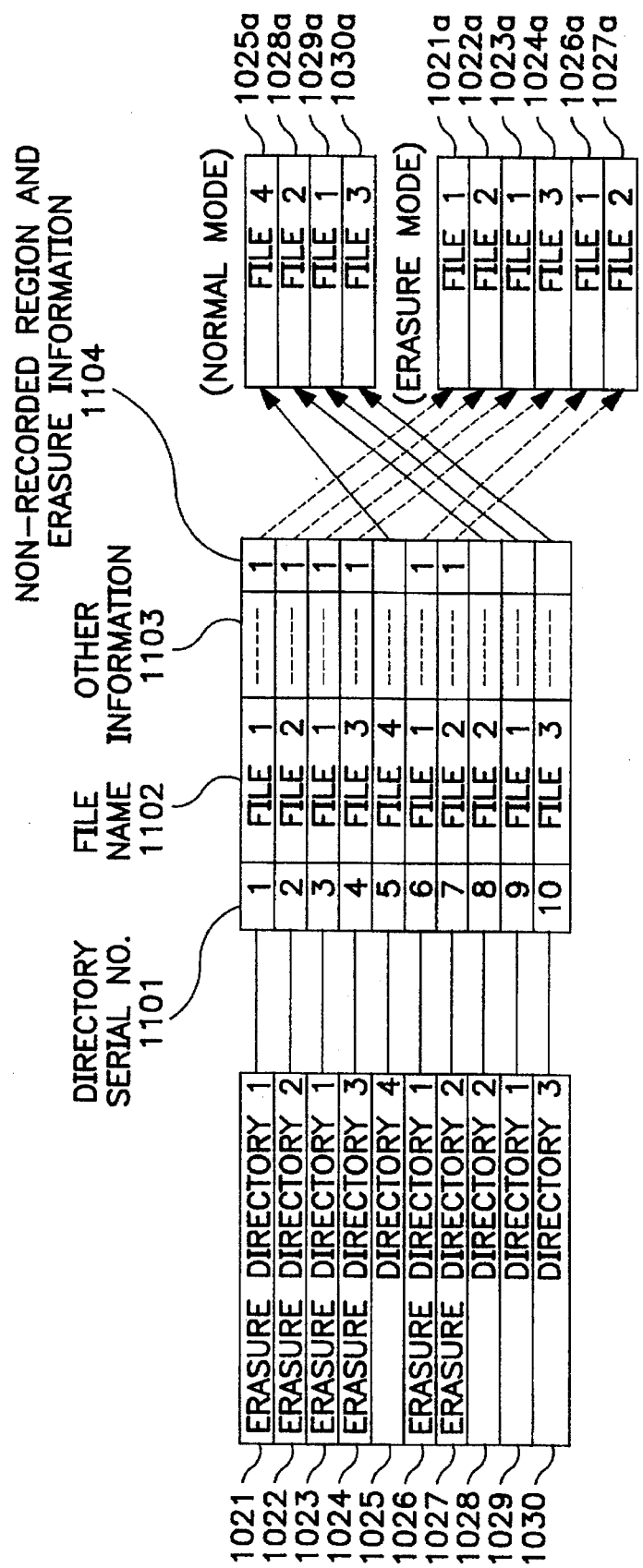
FIG. 10 is a diagram showing the third embodiment of a file managing method of the invention.

The third embodiment will be described in detail hereinbelow with reference to FIG. 10.

In the diagram, reference numerals 1021 to 1030 denote directory sections and 1021a to 1030a indicate data sections.

Among the directory sections 1021 to 1030, reference numerals 1021 to 1024, 1026, and 1027 indicate erasure directories and other reference numerals 1025 and 1028 to 1030 indicate directories. On the other hand, the directory and the erasure directory have the same format. The format is constructed by a directory serial No. section 1101, a file name section 1102, other file management information 1103, and a non-recorded region 1104 to record erasure information. At least one or more bits are assigned to the non-recorded region 1104.

A numeral 1 as erasure information indicative of the completion of the erasure is recorded in the non-recorded region 1104 of each of the erasure directories 1021 to 1024, 1026, and 1027 indicating that the files have logically been erased. As such erasure information, any erasure information which can be used as information such as a numeral, character, symbol, or the like can be used. Nothing is recorded in the non-recorded region of each of the directories 1025 and 1028 to 1030 and those regions are held as space regions.

In the third embodiment, it is assumed that if 1 has been recorded in the non-recorded region 1104, the directory is determined as an erasure directory and that the file which is managed by the erasure directory belongs to the group of logically erased files which are managed in the erasure mode. The file which is managed by the directory in which no information exists in the non-recorded region 1104 belongs to the group of logically existing files which are managed in the normal mode.

Figure 11:
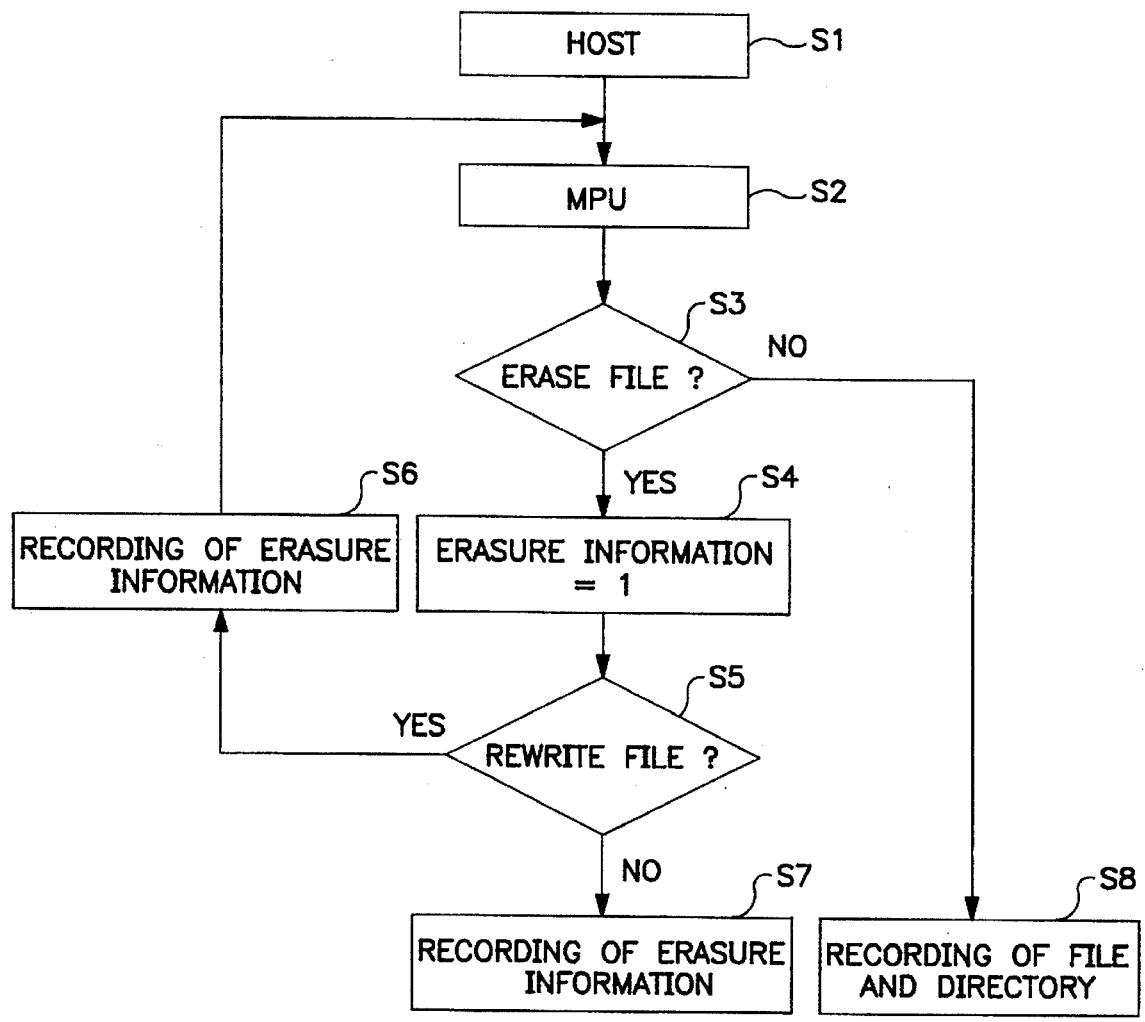
FIG. 11 is a flowchart when information is recorded in the third embodiment of the file managing method of the invention.
Figure 12:
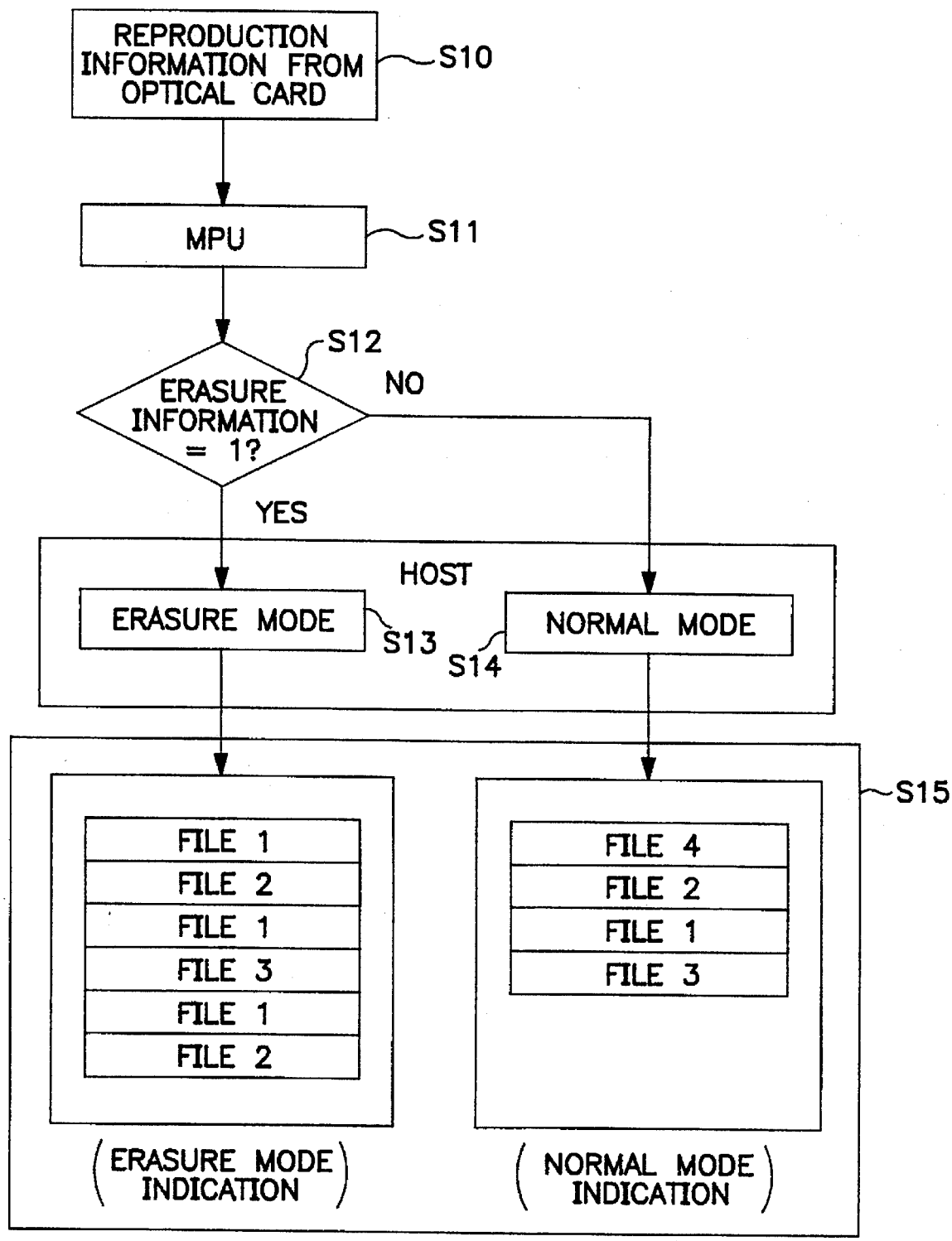
FIG. 12 is a flowchart when information is reproduced in the third embodiment of the file managing method of the invention.

FIG. 11 is a flowchart showing the processing for the case of recording information by the file management method of the third embodiment. FIG. 12 is a flowchart showing the procesing for the case of reproducing information by the file management method of the third embodiment. The file management methods using the directory format mentioned above will now be practically explained hereinbelow with reference to FIGS. 10, 11, and 12.

It is now assumed that the erasure directory 1 of the directory serial No. 1 is the directory 1 before the erasure, that is, the directory 1 in which nothing is recorded in the non-recorded region 1104 and that the content of the file 1 which is managed by the directory 1 is corrected and is again recorded onto the optical card by the same file name.

In FIG. 11, information indicating that the file 1 is rewritten by the same file name as a correction data file 1 of the file 1 is sent from the host in step S1 and is received by the MPU in step S2. A check is then made in step S3 to see if the file is erased or not. If YES, namely, if the file is erased, the erasure information is set to 1 in step S4. In step S5, a check is made to see if the file is rewritten under the same file name or not. If YES, step S6 follows and erasure information indicative of the logical erasure, that is, a numeral 1 is recorded into the non-recorded region 1104 of the directory 1. The file 1 becomes the file which has first logically been erased on the optical card. The directory 1 of the directory serial No. 1 so far is managed as an erasure directory 1. The MPU confirms that the numeral 1 as erasure information has been recorded in the non-recorded region 1104 of the directory 1. A check is again made in step S3 to see if the file is erased or not. In this case, as shown in FIG. 10, since the correction data file 1 and the directory 1 of the directory serial No. 3 which manages the correction data file 1 are newly recorded, the correction data file 1 is first recorded as a file 1 into the file section. The directory 1 of the directory serial No. 3 is subsequently recorded into the directory section 1023. At this time, no information is recorded in the non-recorded region 1104 of the directory 1 and a region 1104 is in a space state.

Thus, the file 1 which has been managed by the file group in the normal mode is managed by the file group in the erasure mode because the directory 1 of the directory serial No. 1 to manage the file 1 is registered as an erasure directory 1. The file 1 which is managed by the directory 1 of the directory serial No. 3 which has newly been recorded is managed by the file group in the normal mode. In FIG. 10, with respect to the erasure of the files of the directory serial Nos. 2 to 4, 6 and 7 which are respectively managed as well, a file management is executed by processes similar to the foregoing file management.

The case where the file is corrected and is again recorded by the same file name has been described above. However, in the case of executing only the erasure of the existing files, if it is determined in step S5 in FIG. 11 that the file is not rewritten (NO), a numeral 1 as erasure information is recorded into the non-recorded region of the directory which manages the file in step S7, thereby logically erasing the file. In this case as well, the erased file is managed by the file group in the erasure mode. If NO in step S3, the file and the directory are recorded in step S8.

A reproducing method of information recorded on the optical card will now be described by using FIGS. 10 and 12. In step S10 in FIG. 12, the files, directories, and erasure directories recorded on the optical card are first reproduced by the reproducing operation of the information recording/reproducing apparatus by a command from the host. The reproduced information is sent to the MPU in step S11. The MPU checks a reference numeral 1 as erasure information exists in the non-recorded region 1104 of each directory or erasure directory or not in step S12. As a result of the discrimination in step S12, a group of files which are managed by the erasure directories of the directory serial Nos. 1 to 4, 6, and 7 in which numeral 1 as erasure information exists are stored into the erasure mode region in the host (step S13). A group of files which are managed by the directories of the directory serial Nos. 5 and 8 to 10 in which no erasure information exists are stored into the normal mode region in the host (step S14). That is, a check is made in step S12 to see if the reproduced information has been erased in the past or not, thereby distributing the reproduced information by mode in accordance with the result of the discrimination in step S12.

For each of the file groups stored in the host every mode, by selecting each mode, the file names are displayed on the display in step S5. It is now assumed that, in each mode, the file names are sequentially displayed in accordance with the reading order from the optical card. In both modes, by selecting the file name, a special file can be accessed and the subsequent processes are executed in a manner similar to those in the file management in the case of a floppy disc.

As mentioned above, in the third embodiment, the logically existing files and the logically erased files can be managed as independent file groups. Thus, while a file management is generally progressed for a group of logically existing files, by selecting the erasure mode, a group of files which have logically been erased in the past can be retrieved.

Figure 13:
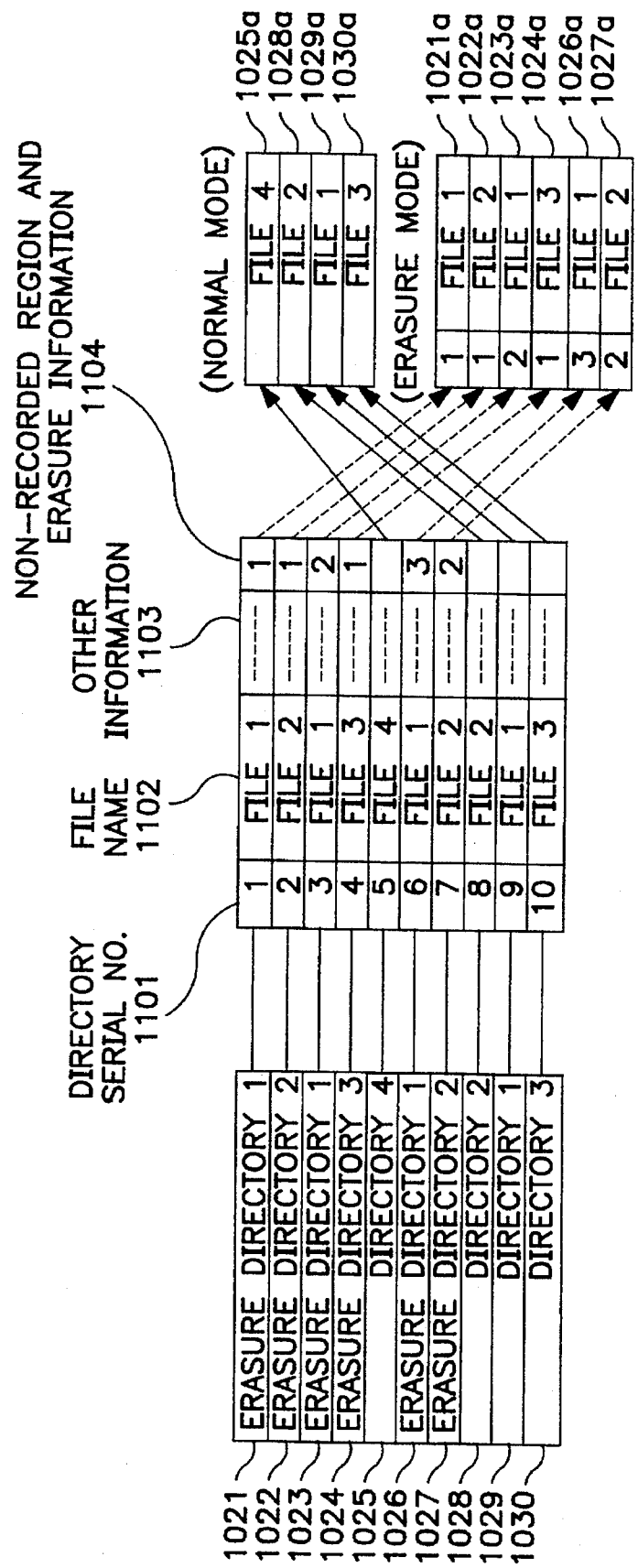
FIG. 13 is a diagram showing a file managing method of a modification of the third embodiment.

As shown in FIG. 13, it is also possible to construct the apparatus in a manner such that the erasure information which is recorded into the non-recorded region 1104 of the erasure directory is recorded as a serial No. indicative of the number of erasing operation times of the files of the same file name on the optical card and is managed. In the above example as well, an effect similar to that in the third embodiment mentioned above can be obtained. In the retrieval of the logically erased files, the function can be further improved.

The recording method of the erasure directories is not limited to that in the third embodiment but when the number of erasure directories has reached a predetermined value, the erasure directories can be also recorded into a special region on the optical card in a group from time to time, when some predetermined number have been recorded. As a management of the erasure directories, it is also possible to construct the apparatus in a manner such that only a predetermined number of erasure directories are used as objects to be managed, and in the case where the predetermined number is set to, for instance, 5, when the erasing and updating operations have been executed seven times, only five erasure directories can be displayed from the erasure directory having a new erasure career. By the above constructions as well, an effect similar to that in the third embodiment is derived and the function of a file management can be improved.

What is claimed is:

1. A file managing method for use in an information recording/reproducing apparatus for managing recording information files by recording directories to manage the recording information files into directory regions provided on an information recording medium, said method comprising the steps of:

forming onto the directory regions an erasure directory regarding the recording information files to be erased in order to logically erase the recording information files;

reading out directories,including the erasure directory, from the directory regions;

discriminating whether or not each of the read directories is an erasure directory;

managing, in an erasure mode, the recording information files corresponding to the directories each discriminated as being an erasure directory in said discriminating step, in a particular order, and managing, in a normal mode, the recording information files corresponding to the directories each discriminated as not being an erasure directory in said discriminating step; and displaying, in a displaying device, file names of the recording information files in said particular order, managed by the erasure mode, by selecting the erasure mode when a logically erased recording information file is reproduced, and reproducing a desired logically erased recording information file by a user selecting the file name of the desired recording information file, wherein said particular order is order of erasure, or, for any plurality of files corresponding to erasure directories having the same file name, is the order of erasure from among that plurality of files.

2. A file managing method for use in an information recording/reproducing apparatus for managing recording data files by recording directories to manage the recording data files into directory regions provided on an information recording medium, said method comprising the steps of:

forming onto the directory regions an erasure directory, including a serial number, regarding the recording data files to be erased in order to logically erase the recording data files;

reading out directories, including the erasure directory, from the directory regions;

discriminating whether or not each of the read directories is an erausre directory;

managing, in an erasure mode, the recording data files corresponding to the directories each discriminated as being an erasure directory in said discriminating step, in a particular order by using said serial number, and managing, in a normal mode, the recording data files corresponding to the directories each discriminated as not being an erasure directory in said discriminating step; and displaying, in a displaying device, file names of the recording data files in said particular order, managed by the erasure mode by selecting the erasure mode when a logically erased recording information file is reproduced, and reproducing a desired logically erased recording data file by a user selecting the file name of the desired recording data file, wherein said particular order is order of erasure, or, for any plurality of files corresponding to erasure directories having the same file name, is the order of erasure from among that plurality of files.

3. A method according to claim 2, wherein the serial numbers are managed for every file of a same file name.

4. A method according to claim 2, wherein the serial numbers indicate the number of erasing operation times of the files.

5. A method according to claim 1, wherein the erasure information is recorded into predetermined regions of directories of the files which are logically erased by existence of the erasure information.

6. A method according to claim 2, wherein the erasure information is recorded into predetermined regions of directories of the files which are logically erased by existence of the erasure information.

* * * * *

UNITED STATES PATENT AND TRADEMARK OFFICE
CERTIFICATE OF CORRECTION

PATENT NO. : 5,659,745

DATED : August 19, 1997

INVENTOR(S): MASATO INOUE

It is certified that error appears in the above-identified patent and that said Letters Patent is hereby corrected as shown below:

COLUMN 2
  Line 35, "file" should read --file,--.

COLUMN 3
  Line 33, "erasure" should read --erased--;
  Line 34, "erasion" should read --erasure--.

COLUMN 4
  Line 56, "25'a" should read --25'a,--.

COLUMN 5
  Line 58, "determined," should read --determined.--

COLUMN 6
  Line 27, "(normal mode)" should read --normal mode--.

COLUMN 9
  Line 14, "erasion" should read --erasure--;
  Line 22, "erasion" should read --erasure--;
  Line 24, "erasion" should read --erasure--;
  Line 27, "erasion" should read --erasure--;
  Line 28, "enen" should read --even--; and
    "erassion" should read --erasure--.
  Line 25, "erasion" should read --erasure--;

UNITED STATES PATENT AND TRADEMARK OFFICE
CERTIFICATE OF CORRECTION

PATENT NO. : 5,659,745

DATED : August 19, 1997

INVENTOR(S) : MASATO INOUE

It is certified that error appears in the above-identified patent and that said Letters Patent is hereby corrected as shown below:

<u>COLUMN 12</u>
  Line 67 "erausre" should read --erasure--.

Signed and Sealed this

Twenty-eighth Day of April, 1998

BRUCE LEHMAN

Attest:

*Attesting Officer*     *Commissioner of Patents and Trademarks*